P. W. GROOM.
Handle-Sockets for Shovels, Spades, and Scoops.
No. 213,414. Patented Mar. 18, 1879.
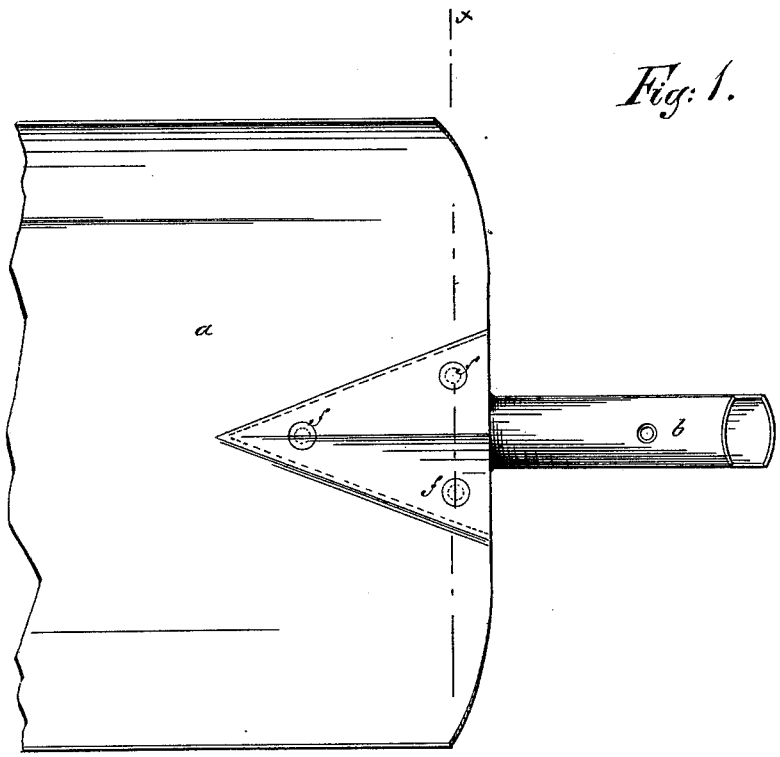
Fig. 1.
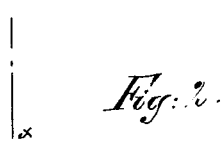
Fig. 2.
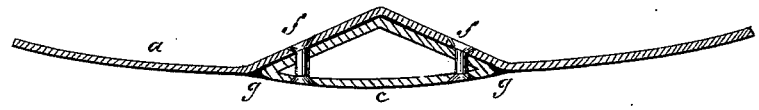
Fig. 3.
WITNESSES:
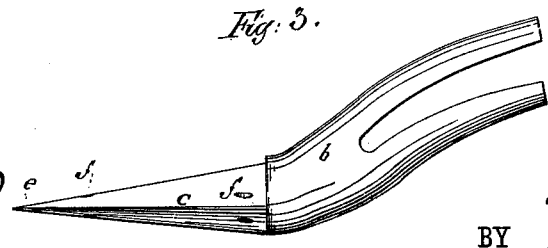
INVENTOR:
P. W. Groom
BY
ATTORNEYS.

UNITED STATES PATENT OFFICE.

PATRICK W. GROOM, OF ST. LOUIS, MISSOURI, ASSIGNOR TO THE GROOM SHOVEL COMPANY, OF SAME PLACE.

IMPROVEMENT IN HANDLE-SOCKETS FOR SHOVELS, SPADES, AND SCOOPS.

Specification forming part of Letters Patent No. 213,414, dated March 18, 1879; application filed November 4, 1878.

*To all whom it may concern:*

Be it known that I, PATRICK W. GROOM, of St. Louis, in the county of St. Louis and State of Missouri, have invented a new and Improved Handle-Socket for Shovels, Spades, and Scoops, of which the following is a specification:

In the manufacture of farm-shovels what is known as the "strap" has been formed integrally with the shovel, and has also been constructed separately and attached to the plane surface of the back of the blade by means of rivets.

The first mode is objectionable on account of the cost of manufacture, and the other chiefly on account of the projection of the strap from the back of the blade.

To overcome these objections I adopt the construction and arrangement of parts hereinafter described.

In the accompanying drawings, Figure 1 is a plan view of a shovel-blade with my improved socket and strap connected therewith. Fig. 2 is a cross-section on the line $x\,x$. Fig. 3 is an elevation of the strap and socket detached.

Similar letters of reference indicate corresponding parts.

$a$ represents a shovel-blade, which may be made in any usual form and of ordinary material. $b$ is the handle-socket, and $c$ the strap, made in one hollow piece, preferably of malleable iron.

The socket $b$ may be made as long as desired, and strap $c$ is of the shape in cross-section as shown by Fig. 2, the upper side $\wedge$ shape, and the under side rounded to conform to the shape of blade $a$, and terminating in a flat point, as at $e$.

The blade $a$ is formed with a depression to receive the strap $c$ upon the under side, and the strap is attached by rivets $f$, the heads of which are countersunk in the blade and strap to make a smooth finish.

One rivet is inserted through the point of the strap, and one through each of its sides near the upper end. I thus secure a broad bearing and a firm attachment of the strap to the blade, so that the two will not separate, nor their connection be loosened by hard use of the shovel.

The connection of the strap to the blade is completed by brazing or solder, which covers the joint between the two, as seen at $g$, and gives a smooth surface at the back of the shovel and leaves no edges.

By this construction I obtain the advantages of a smooth-back shovel at less cost than heretofore possible, and the clogging incidental to back-straps as usually connected is entirely overcome.

I do not claim, broadly, the invention of a shovel-strap which is triangular in cross-section and secured in a countersink in the shovel-blade; but,

Having thus described my invention, I claim as new and desire to secure by Letters Patent—

As the improvement in shovels hereinbefore set forth, the combination, with the shovel-blade $a$, having the broad countersink or depression specified, of the handle-socket $b$ and the hollow triangular tapered strap $c$, having rivet-holes in point and sides, and the rivets $f$ inserted therethrough, and having countersunk heads, said strap being also rounded to conform to the back of the blade $a$, all as shown and described, for the purpose specified.

PATRICK W. GROOM.

Witnesses:
C. E. BELL,
C. O. MAHOOD.